United States Patent [19]
Nelson et al.

[11] 3,832,018
[45] Aug. 27, 1974

[54] TRACK PIN RETAINING INSERT
[75] Inventors: David V. Nelson; Roger L. Boggs, both of East Peoria, Ill.
[73] Assignee: Caterpillar Tractor Co., Peoria, Ill.
[22] Filed: Aug. 27, 1973
[21] Appl. No.: 391,549

[52] U.S. Cl. ............... 305/39, 277/206, 74/255 R, 305/11
[51] Int. Cl. ...................... B62d 55/20, F16g 13/06
[58] Field of Search .................. 305/11, 39, 52, 56; 74/255 R, 256; 277/206

[56] References Cited
UNITED STATES PATENTS

| 2,376,864 | 5/1945 | Eberhard | 305/11 |
| 3,013,844 | 12/1961 | Mazzarius | 305/56 X |
| 3,060,761 | 10/1962 | Barkley | 305/11 X |
| 3,178,239 | 4/1965 | Zeller | 305/11 |
| 3,365,246 | 1/1968 | Otis et al. | 305/11 |
| 3,390,922 | 7/1968 | Reinsma | 305/11 |

FOREIGN PATENTS OR APPLICATIONS

| 1,085,433 | 7/1960 | Germany | 305/39 |

Primary Examiner—Robert S. Ward, Jr.
Attorney, Agent, or Firm—Phillips, Moore, Weissenberger Lempio & Strabala

[57] ABSTRACT

A track-type tractor comprises an endless track assembly having a plurality of shoes articulated together by a pair of laterally spaced link assemblies. Each link assembly comprises a pair of adjacent links pivotally mounted together by a pin and bushing assembly. An annular, hardened insert is press-fitted between the pin and an outboard one of the links to prevent loosening thereof during tractor operation.

8 Claims, 3 Drawing Figures

TRACK PIN RETAINING INSERT

BACKGROUND OF THE INVENTION

The articulated joints employed in a conventional track assembly for a track-type tractor are severely stressed during tractor operation. Various means, such as cotter pins, lock rings and bearing caps, are utilized to counteract such stresses to prevent loosening of the joints. Such prior art approaches are exemplified by the teachings of U.S. Pat. Nos. 1,694,035; 2,551,695; 2,823,081; 3,601,454 and 3,717,389. Additionally, U.S. Pat. No. 3,586,398, pertaining to a track roller and issued to the Assignee is cited because similar stress reaction characteristics are encountered and disclosed.

SUMMARY OF THIS INVENTION

An object of this invention is to provide a noncomplex and economical pivot pin retaining means for preventing loosening of the pivotal joints of an articulated track assembly. The track assembly comprises a plurality of closely coupled ground engaging track shoes and a pair of laterally spaced articulated link assemblies connected to the shoes. Each link assembly comprises a pair of circumferentially adjacent links and a common pivot means for pivotally mounting the laterally spaced pairs of links of the two link assemblies together. The pivot means comprises a pin having a cylindrical bearing bushing mounted thereon and a hardened annular insert press-fitted between each end of the pin and a respective outboard link of each pair of links to provide the sole securance therebetween. Thus, the need for extraneous retaining means, such as cotter pins, lock rings, extended bosses formed on the links and the like, is eliminated.

DETAILED DESCRIPTION

Figure 1:
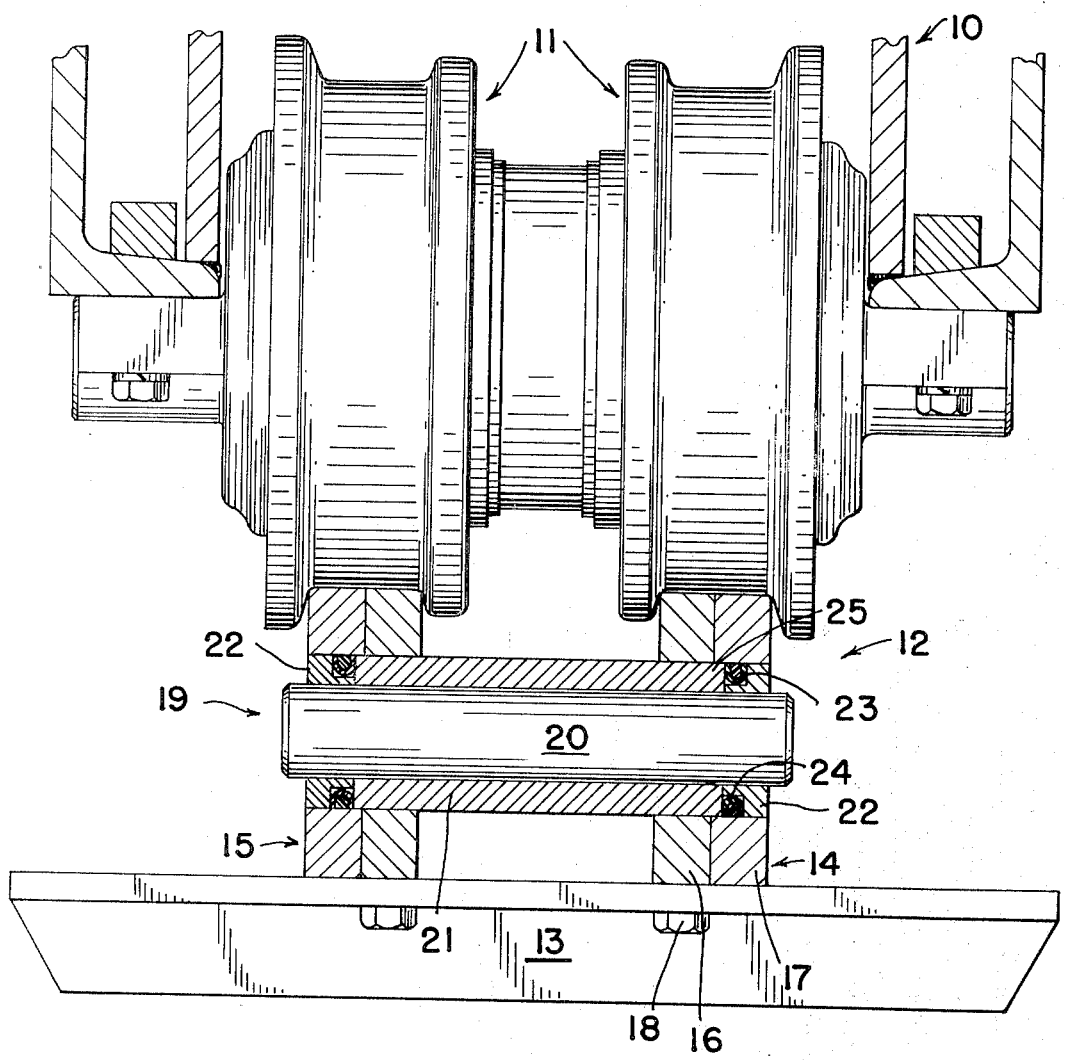
FIG. 1 is a sectioned, front elevational view illustrating an articulated track assembly, employing a first pivot means embodiment of this invention therein, supporting track rollers of a track-type vehicle thereon.

FIG. 1 illustrates a portion of a conventional track-type tractor comprising a frame 10 having a pair of flanged track rollers 11 rotatably mounted thereon. The track rollers are supported on a partially illustrated endless track assembly 12. The track rollers function in a conventional manner to guide the track assembly in its travel thereunder to prevent undue shifting thereof, particularly during side hill operations and directional changes of the tractor.

The track assembly comprises a plurality of closely coupled ground-engaging track shoes 13 (one shown) and a pair of laterally spaced articulated link assemblies 14 and 15, each comprising a pair of of circumferentially adjacent inboard and outboard links 16 and 17, respectively. Each laterally spaced pair of inboard links 16 are connected to the track shoe by releasable bolts 18 in a conventional manner. The outboard links are connected to the next adjacent track shoe in a like manner (not shown).

A pivot means 19 pivotally mounts the inboard links to the outboard links to articulate the track shoes together. The pivot means comprises a cylindrical pin 20 having a cylindrical bearing bushing 21 pivotally mounted thereon. Inboard links 16 may be press-fitted or otherwise suitably secured on the bearing bushing.

A hardened annular insert 22, having its outer end substantially flush with respect to outer surface of a respective outboard link 17, is press-fitted between each end of the pin and an internal bore 22a in an outboard link to provide the sole securance therebetween. For example, the insert may have an interference fit of 0.012 in. with a 2 inch pin and an unassembled intereference fit approximating 0.002 in. to 0.004 in. with the internal bore formed in outboard link 17.

Such interference fits between the inserts 22 and the somewhat smaller diameter bores 22a will provide each outboard link with a minimum pin retention force approximating 70,000 pounds. In addition, each insert may be suitably heat treated prior to its installation to a Rockwell hardness approximately C35 to 40. Each insert further comprises an annular groove 23 formed thereon to accommodate an annular sealing means 24 and each end 25 of the pin preferably extends into the bore of a respective outboard link to abut the sealing means.

It should be noted that the bore area of outboard link 17, adjacent to insert 22, normally comprises a Rockwell hardness approximately C25 to 40 to assure an optimum degree of strength and ductility thereat for anti-fracturing purposes. Such bore hardness by itself would not provide sufficient resistance to pin bore growth during tractor operation to prevent loosening of the sealed track joint. However, the addition of hardened insert 22 to the pivot means provides such desiderata, i.e., the insert substantially isolates external operating forces which tend to unduly stress the sealed track joint.

Such isolation is desirable and beneficial in that retention and structural functions are effectively separated so that optimum performance from each component is obtained. Regardless of the type of heat treatment, pin bore growth inherently occurs during operations due to heavy pounding of the track rollers and high tensile loading of the track chain. Such growth results in pins and links loosening and separating, a loss of critical seal face loads, and, consequently, detrimentally affects the service life of the entire hinge joint.

Provision of separate retaining inserts prevents road shock absorbed by the links from acting directly upon the bore to cause such growth. The inserts increased hardness and improved spring-like maintenance of radial compressive loads effectively extends the links pin retaining capability, due to its relative isolation and immunity from destructive external forces. Such isolation and the ability for the insert to grow radially outward about its relatively large outer diameter also contributes toward the desirable increased holding capability of the hinge joint.

Figure 2:
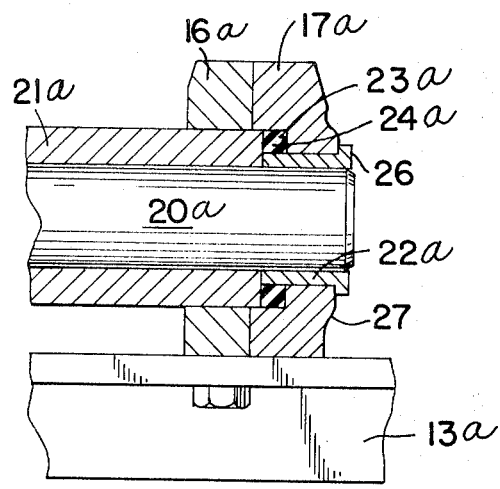
FIG. 2 is a partially sectioned view illustrating a modification of the pivot means.
Figure 3:
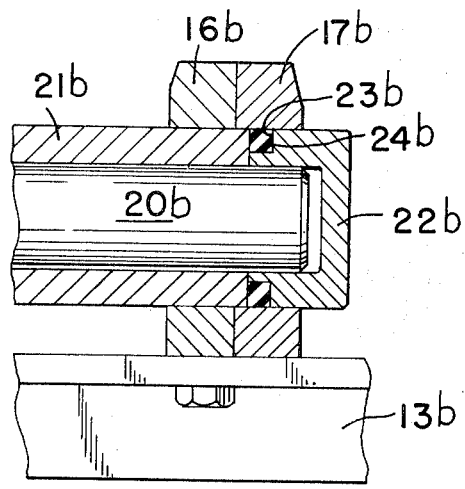
FIG. 3 is a view similar to FIG. 2 illustrating a further modification of the pivot means.

FIGS. 2 and 3 illustrate modifications of pivot means 19 wherein corresponding constructions are depicted by identical numerals, with such numerals being accompanied by an "*a*" in FIG. 2 and a "*b*" in FIG. 3.

In FIG. 2, an annular insert 22 comprises a cylindrical portion press-fitted between an outboard link 17*a* and a pin 20*a*. A radial flange 26 is integrally formed on an outboard end of the insert to abut an outer surface of the outboard link. Although such outboard link has an annular boss 27 formed thereon, it should be understood that such boss could be eliminated to provide a flat outer surface on the link, such as that shown on corresponding link 17 in FIG. 1. It should be further noted that an annular groove 23a is formed internally on link 17a to retain an annular sealing means 24a between the outboard link, the insert and an end of a bearing bushing 21a.

FIG. 3 discloses a further modification wherein an insert 22b comprises a cup-shaped member press-fitted between an outboard link 17b and a pin 20b. The inboard end of the cup-shaped member abuts an end of a bearing bushing 21b and an annular groove 23b is formed in the member to retain an annular seal 24b therein.

What is claimed is:

1. An articulated track assembly comprising
a plurality of closely coupled ground-engaging track shoes,
a pair of laterally spaced articulated link assemblies, each comprising a pair of circumferentially adjacent links, connected to said shoes, and
common pivot means pivotally mounting each pair of links of each link assembly together to form an articulated track assembly, said pivot means comprising
a pin,
a cylindrical bearing bushing mounted on said pin and having an inboard link of each pair of links secured thereon, and
a hardened annular insert press-fitted between each end of said pin and a respective outboard link of each pair of links and providing the sole securance therebetween.

2. The track assembly of claim 1 further comprising annular sealing means confined between each end of said bearing bushing, a respective insert and a respective outboard link.

3. The track assembly of claim 1 wherein an outer end of each insert is substantially flush with respect to an outer surface of a respective outboard link.

4. The track assembly of claim 1 wherein a radial flange is integrally formed on an end of each insert and abuts an outer surface of a respective outboard link.

5. The track assembly of claim 1 wherein each of said inserts is cup-shaped.

6. The track assembly of claim 1 wherein each insert has a hardness which is substantially greater than the hardness of a bore area of a respective outboard link mounting such insert therein.

7. The track assembly of claim 6 wherein each insert has a Rockwell hardness of from C35 to 40 and each of said bore areas has a Rockwell hardness of from C25 to 30.

8. The track assembly of claim 1 in which said outboard links individually provide an insert bore of a size sufficiently smaller in diameter then the diameter of said press-fittted insert in order to permit simultaneous radial outward growth of the insert with the bore without any appreciable impairment of its retentive effect on the pin.

* * * * *